(12) United States Patent
Wojnowski

(10) Patent No.: US 6,402,199 B1
(45) Date of Patent: Jun. 11, 2002

(54) VEHICLE STORAGE TANK MOUNTING ASSEMBLY

(75) Inventor: Stanley J. Wojnowski, Mendon, MA (US)

(73) Assignee: United Plastic Fabricating Inc., North Andover, MA (US)

(*) Notice: Subject to any disclaimer, the term of this patent is extended or adjusted under 35 U.S.C. 154(b) by 0 days.

(21) Appl. No.: 09/501,507

(22) Filed: Feb. 9, 2000

Related U.S. Application Data

(60) Provisional application No. 60/152,759, filed on Sep. 8, 1999.

(51) Int. Cl.$^7$ .................................................. B60P 3/22
(52) U.S. Cl. ....................... 280/838; 280/830; 280/831; 280/839; 248/146; 248/121
(58) Field of Search .................................. 280/830, 501, 280/595, 831, 838, 839; 220/1.5, 401, 71, 1.6, 216; 414/525.1; 206/598; 248/121, 205.1, 146, 311.2

(56) References Cited

U.S. PATENT DOCUMENTS

| | | | |
|---|---|---|---|
| 681,760 A | * | 9/1901 | Vanderbilt |
| 710,636 A | * | 10/1902 | Vanderbilt |
| 716,063 A | * | 12/1902 | Langenheim |
| 1,111,491 A | | 9/1914 | Priebe |
| 1,229,884 A | | 6/1917 | Caughey |
| 1,509,121 A | | 9/1924 | Willoughby |
| 1,596,627 A | | 8/1926 | Rosenfeld |
| 1,663,375 A | | 3/1928 | Kirchner |
| 1,846,768 A | | 2/1932 | Sullivan |
| 1,891,779 A | | 12/1932 | Robbins |
| 2,114,822 A | | 4/1938 | Thwaits ........................ 280/5 |
| 2,226,713 A | | 12/1940 | Folmsbee ................... 105/362 |
| 3,022,028 A | * | 2/1962 | Rinhard et al. ............... 248/23 |
| 3,766,862 A | * | 10/1973 | Heap et al. ................. 105/358 |
| 3,819,138 A | | 6/1974 | Rehkopf et al. ............ 248/146 |
| 4,257,332 A | | 3/1981 | Sechrist ...................... 105/362 |
| 4,318,549 A | * | 3/1982 | Pletcher ...................... 280/5 C |
| 4,442,991 A | | 4/1984 | Levens ....................... 248/146 |
| 4,593,832 A | * | 6/1986 | Gerhard ...................... 220/1.5 |
| 4,629,085 A | | 12/1986 | Gerhard ...................... 220/1.5 |
| 4,903,446 A | * | 2/1990 | Richards et al. .......... 52/223 R |
| 5,118,006 A | * | 6/1992 | Gerhard ...................... 220/565 |
| 5,501,504 A | * | 3/1996 | Kunz .......................... 296/164 |
| 5,593,070 A | | 1/1997 | Steadman ................... 222/608 |
| 5,624,225 A | * | 4/1997 | Cox ............................. 414/495 |
| 5,752,616 A | * | 5/1998 | Watkinson .................. 220/453 |
| 6,000,342 A | * | 12/1999 | Thoman et al. ............. 105/413 |

* cited by examiner

*Primary Examiner*—Lanna Mai
*Assistant Examiner*—Paul Royal, Jr.
(74) *Attorney, Agent, or Firm*—Scott J. Asmus; Vernon C. Maine

(57) ABSTRACT

The present invention is directed to a mounting assembly for firmly securing a storage tank having a curved bottom wall to a chassis of a vehicle. The mounting assembly includes a pair of longitudinal support structures for securing to the bottom wall of the storage tank, a cross bracket for mounting between the longitudinal support structures, a sub-frame for supporting the longitudinal support structures, and a bracket assembly for securing the cross bracket to the sub-frame.

13 Claims, 6 Drawing Sheets

VEHICLE STORAGE TANK MOUNTING ASSEMBLY

RELATED APPLICATION(S)

This application claims the benefit of U.S. Provisional Application No. 60/152,759, filed Sep. 8, 1999, the entire teachings of which are incorporated herein by reference.

BACKGROUND

Elongate storage tanks on trucks for holding liquids such as water often have an elliptical or circular cross section. For uses such as fire fighting, the tanks are sometimes made of plastic, for example, polypropylene. Such storage tanks are typically supported by a cradle type structure that is mounted to the frame or chassis of the truck. The drawback of the typical cradle structure is that the storage tank merely rests upon the cradle structure, and as a result, can lift off the cradle structure when the truck goes over bumps or around sharp corners.

SUMMARY OF THE INVENTION

The present invention is directed to a mounting assembly for firmly securing a storage tank to the chassis of a vehicle in a manner which prevents lifting of the tank during normal usage. The mounting assembly includes a pair of longitudinal support structures for securing to a bottom wall of the storage tank, a cross bracket for mounting between the longitudinal support structures, a sub-frame for supporting the longitudinal support structures and the cross bracket, and a bracket assembly for securing the cross bracket to the sub-frame to prevent the tank from lifting upwardly relative to the sub-frame.

In preferred embodiments, the storage tank and longitudinal support structures are formed of plastic, and the cross bracket, sub-frame and bracket assembly are formed of metal. Typically, the storage tank has a curved bottom wall. The longitudinal support structures are generally channel shaped. Internal reinforcement members are included for extending along the inside of the longitudinal support structures to clamp the cross bracket to the longitudinal support structures and distribute stress. The reinforcement members are preferably metallic angle brackets. The sub-frame includes two longitudinal members connected together by a connecting structure. The bracket assembly preferably includes a series of U-shaped brackets for securing the connecting structure of the sub-frame to the cross bracket. The sub-frame is mounted to the chassis rails of the vehicle and isolator pads are included for positioning therebetween to isolate the sub-frame from the chassis rails. In addition, resilient pads are provided for positioning between the longitudinal support structures and the sub-frame.

The present invention mounting assembly allows a plastic storage tank having a curved bottom wall to be securely mounted to the chassis of a vehicle in a relatively simple and inexpensive fashion so that the tank does not lift relative to the chassis during normal operation of the vehicle, for example, going over bumps and around corners. This is accomplished without overstressing the plastic components of the tank.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
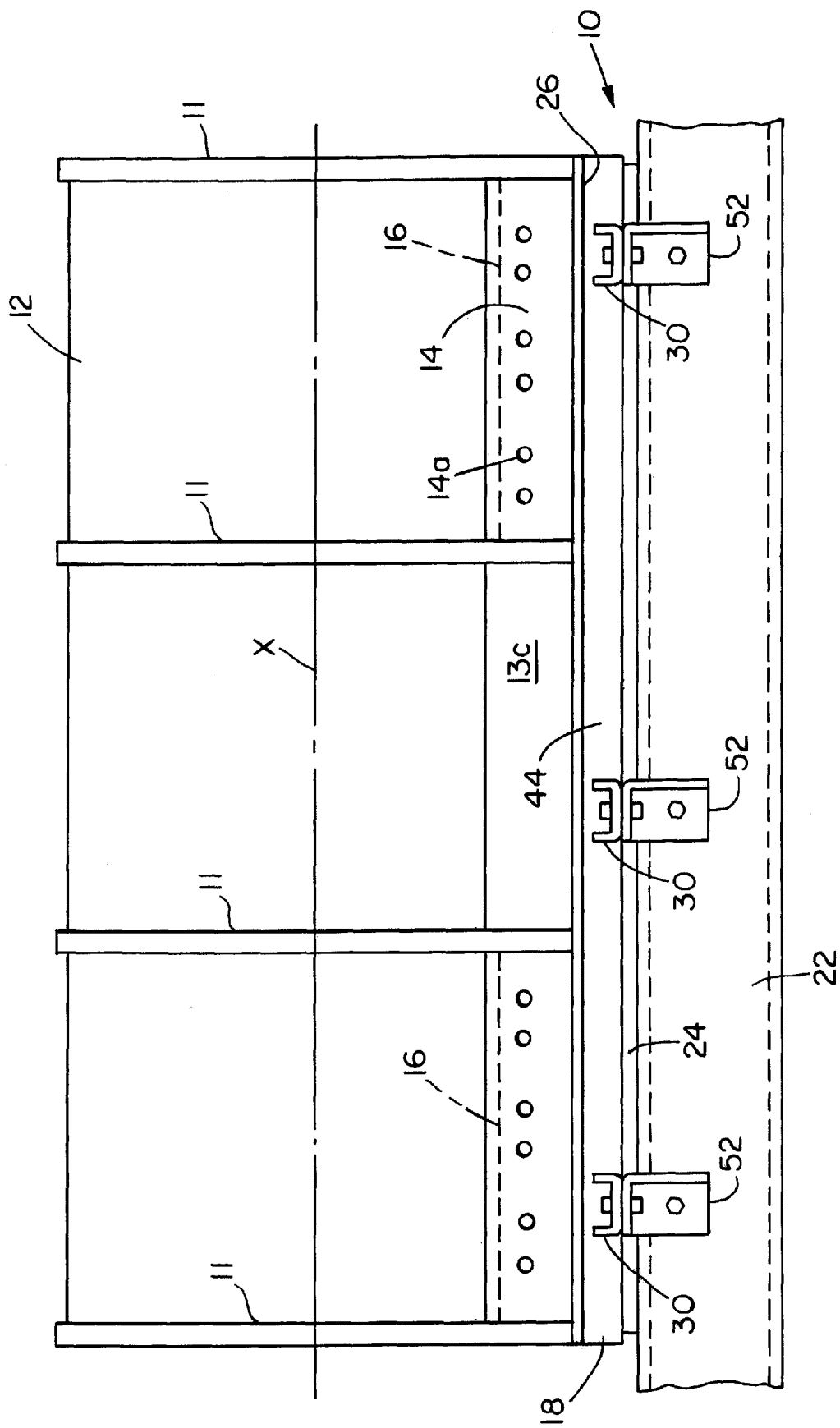
FIG. 1 is a side view of a vehicle storage tank mounted to a truck chassis with the present invention vehicle storage tank mounting assembly.
Figure 2:
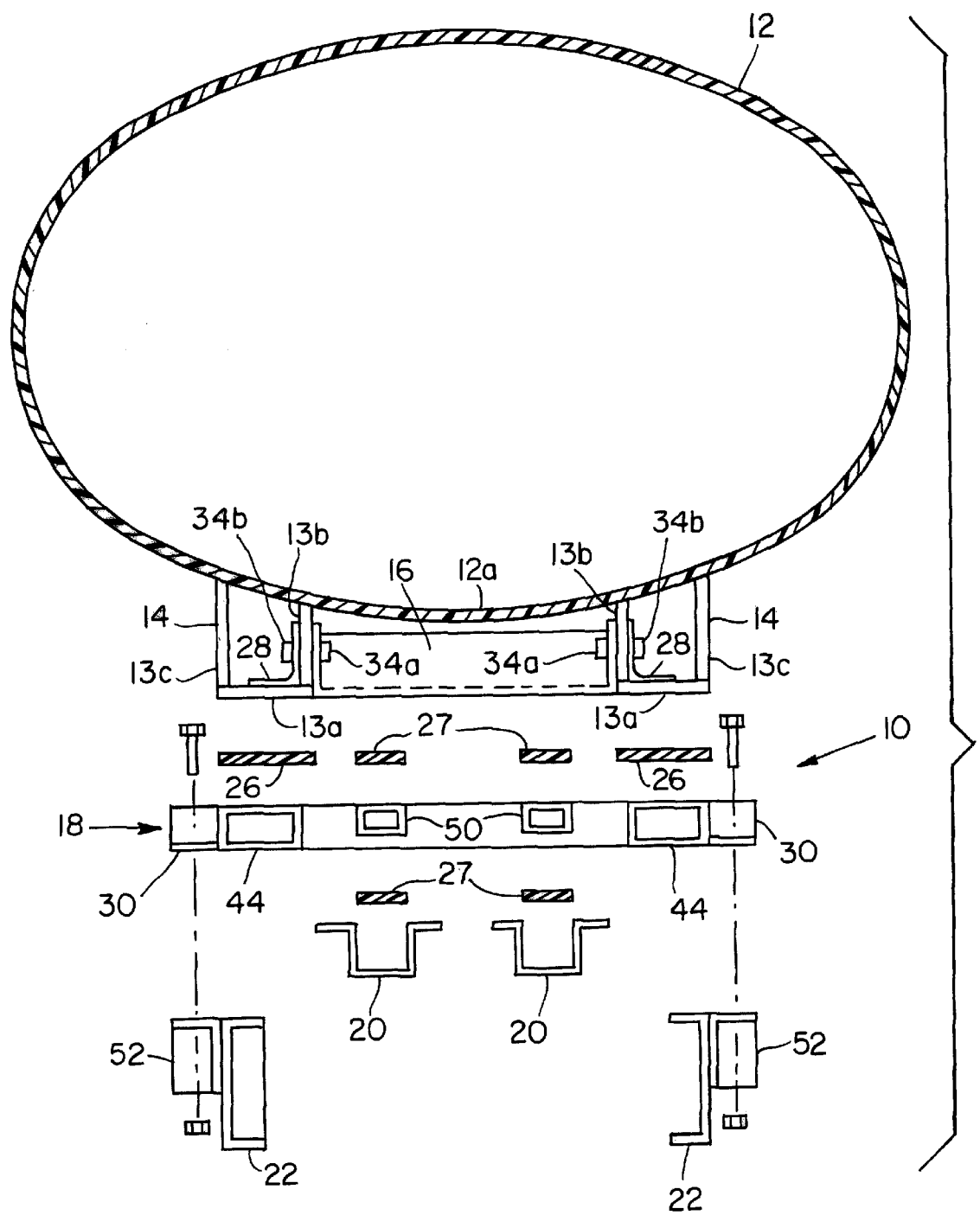
FIG. 2 is an exploded cross sectional view of the vehicle storage tank, the mounting assembly and the truck chassis depicted in FIG. 1.
Figure 3:
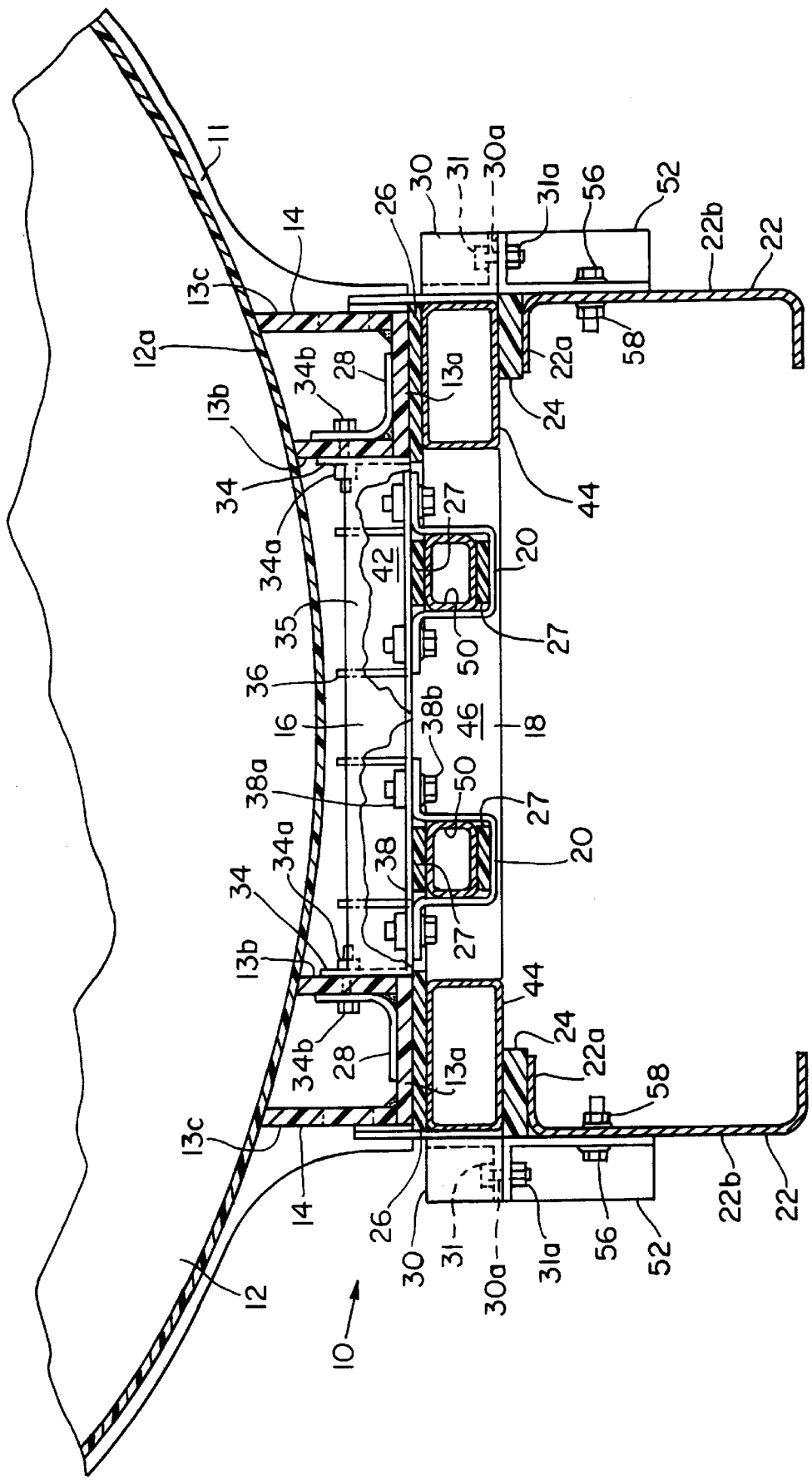
FIG. 3 is a cross sectional view of the storage tank mounted to the truck chassis by the present invention vehicle storage tank mounting assembly.

Referring to FIGS. 1–3, storage tank mounting assembly 10 firmly secures a liquid storage tank 12 having a curved bottom wall to the chassis rails 22 of a vehicle such as a truck. Tank 12 typically has an elliptical cross section and is preferably formed of plastic such as high impact copolymer polypropylene that utilizes AMOCO AccTuf™ resin. Alternatively, tank 12 can be made of other suitable plastics. Tank 12 includes a series of exterior ribs 11 spaced apart from each other along the longitudinal axis X of tank 12 for strengthening tank 12. Tank 12 is suitable for storing liquids such as water.

Mounting tank assembly 10 includes two generally channel-shaped longitudinally extending longsill plastic support structure weldments 14 which are welded to the curved bottom wall 12a of tank 12 (FIGS. 2 and 3). Two metal cross bracket weldments 16 are secured between the longsill weldments 14 below tank 12, thereby, connecting the longsill weldments 14 together. The longsill weldments 14 and the cross bracket weldments 16 are supported by a metal sub-frame 18. The cross brackets 16 are secured to the sub-frame 18 by a series of U-shaped brackets 20 which prevents movement of the tank 12 relative to sub-frame 18. The sub-frame 18 is secured to the longitudinally extending chassis rails 22 of the truck by a series of mounting brackets 52. As a result, the tank 12 is affixed to the chassis rails 22 of the truck and will not move or shift relative to the chassis rails 22 when the truck goes over bumps or around sharp corners.

A more detailed description of mounting assembly 10 now follows. Longsill weldments 14 longitudinally extend along tank 12 (FIG. 1). The longsill weldments 14 are about the same length as tank 12 and are spaced apart and parallel to each other. Preferably, the longsill weldments 14 consist of two or more sections which are assembled to form the desired length. Longsill weldments 14 have a flat lower wall 13a and two parallel side walls 13b/13c (FIGS. 2 and 3) which are welded together into a channel shaped structure. When the side walls 13b/13c are welded to the bottom wall 12a of tank 12, the longsill weldments 14 form hollow support structures for tank 12. The outer side walls 13c are higher than the inner side walls 13b to compensate for the curvature of the tank 12 in order to horizontally position the lower walls 13a. The longsill weldments 14 provide longitudinal stiffness to the tank 12 in addition to providing vertical support. Although the longsill weldments 14 are preferable channel shaped, alternatively, other suitable configurations can be employed. For example, the longsill weldments 14 may have angled or curved walls. Furthermore, longsill weldments 14 may have a solid cross section instead of a hollow cross section.

The cross bracket weldments 16 (FIGS. 4–6) are longitudinally spaced apart from each other relative to tank 12 and mounted between opposed inner side walls 13b of the longsill weldments 14 with a series of bolts 34b and nuts 34a at the ends thereof (FIGS. 2 and 3). A series of metal elongate longsill reinforcement members 28 having angled cross sections are inserted into the interior of each longsill weldment 14 against the inner side walls 13b and lower walls 13a. This allows the metal cross bracket weldments 16 to be tightly secured to the plastic longsill weldments 14 by clamping the plastic inner side walls 13b between the cross bracket weldments 16 and longsill reinforcement members 28 with bolts 34b and nuts 34a. The longsill reinforcement members 28 distribute the clamping forces of each bolt 34b over the inner 13b and lower 13a walls of the longsill weldments 14 which prevents overstressing of the plastic inner side walls 13b in the regions surrounding each bolt 34b. As a result, the bolts 34b do not damage the inner side walls 13b of the longsill weldments 14. The angled cross sectional shape of the longsill reinforcement members 28 not only distributes stress over both the inner side walls 13b and the bottom walls 13a of the longsill weldments 14, but also provides strength in both the lateral and vertical directions. The longsill weldments 14 have a series of holes 14a in the outer side walls 13c (FIG. 1) which allow the insertion of tools therethrough for tightening or loosening bolts 34b.

Figure 4:
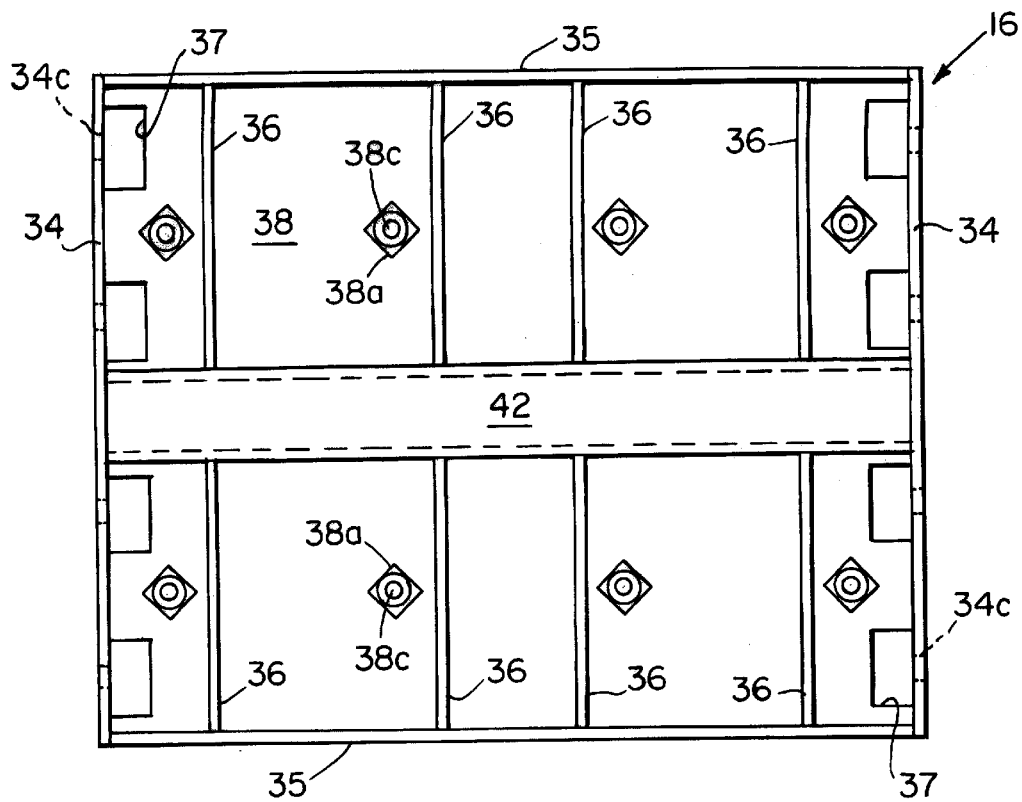
FIG. 4 is a top view of an embodiment of a cross bracket weldment for the storage tank mounting assembly.
Figure 5:
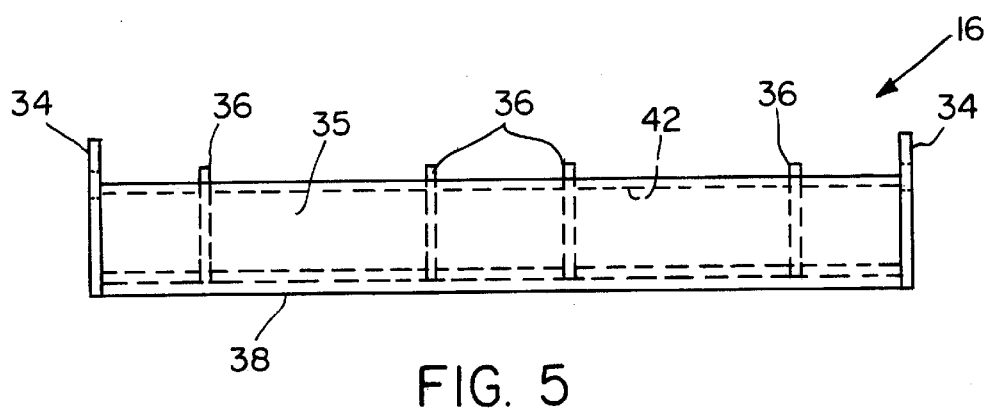
FIG. 5 is an end view of the cross bracket weldment of FIG. 4.
Figure 6:
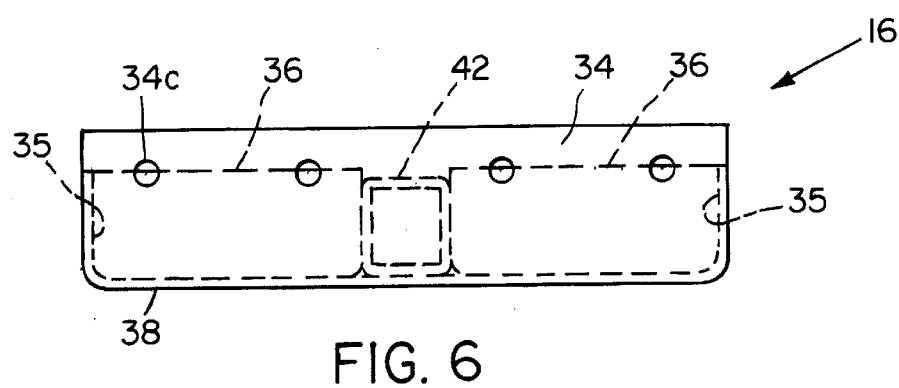
FIG. 6 is a side view of the cross bracket weldment of FIG. 4.

Referring to FIGS. 4–6, each cross bracket weldment 16 includes a base plate 38 having two upwardly bent side walls 35, two vertical end plates 34, a square tubing cross member 42 and four vertical rib plates 36 which are welded together. The rib plates 36 and cross member 42 provide increased stiffness to the central areas of base plate 38. A series of nuts 38a with threaded holes 38c therethrough are welded to the inner surface of base plate 38 for enabling the U-shaped brackets 20 to be bolted to the cross bracket weldments 16 with bolts 38b. A series of holes 34c are provided in the end plates 34 which allow the longsill weldments 14 to be bolted to the cross bracket weldments 16 with bolts 34b and nuts 34a. A series of retangular holes 37 extend through base plate 38 adjacent to end plates 34 and below holes 34c in order to provide access for a wrench to tighten nuts 34a. Once secured, the cross bracket weldments 16 provide added support surfaces for tank 12 in addition to longsill weldments 14 and prevent spreading of the longsill weldments 14 relative to each other due to the weight of tank 12. FIGS. 4–6 depict one preferred cross bracket weldment 16, however, alternatively, other suitable configurations can be employed. For example, cross bracket weldment 16 can be primarily formed from rectangular tubing.

Figure 7:
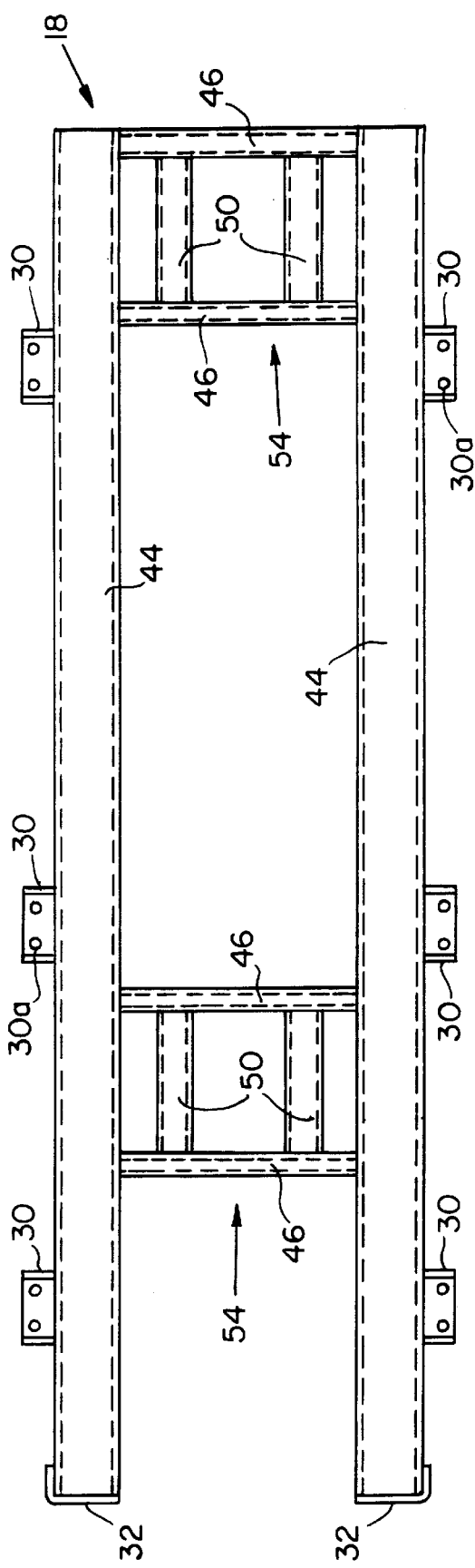
FIG. 7 is a top view of an embodiment of a sub-frame weldment for the storage tank mounting assembly.
Figure 8:
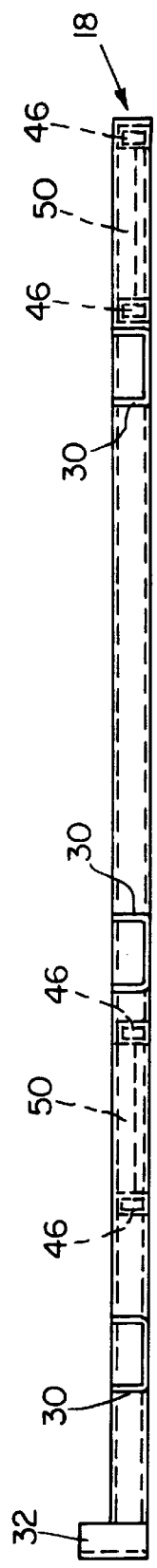
FIG. 8 is a side view of the sub-frame weldment of FIG. 7.
Figure 9:
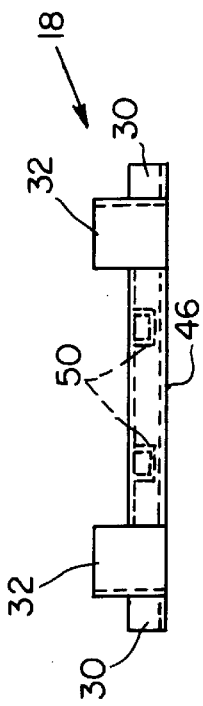
FIG. 9 is an end view of the sub-frame weldment of FIG. 7.
Figure 10:
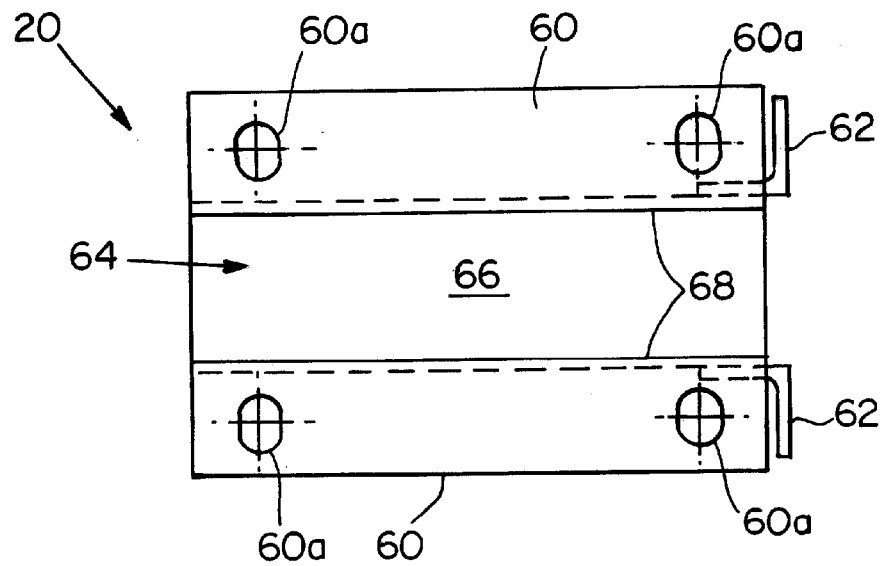
FIG. 10 is a top view of an embodiment of a clamping bracket for the storage tank mounting assembly.
Figure 11:
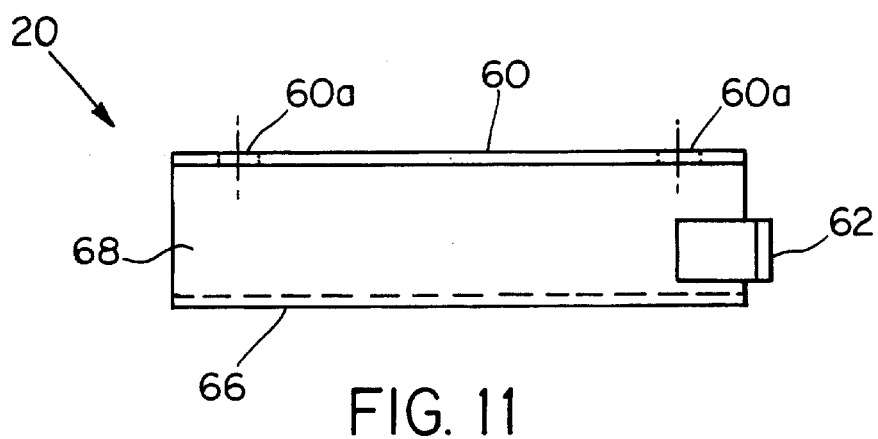
FIG. 11 is a side view of the clamping bracket of FIG. 10.
Figure 12:
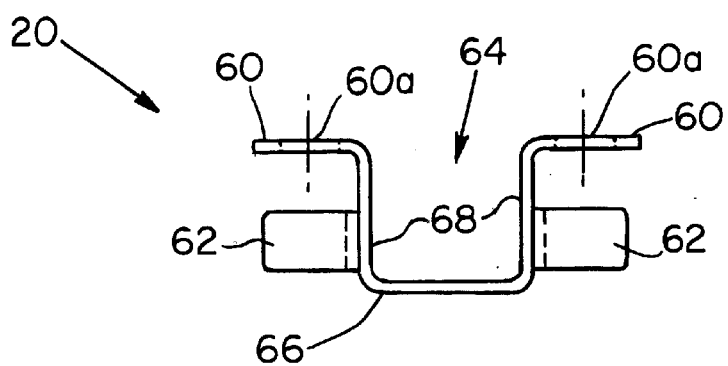
FIG. 12 is an end view of the clamping bracket of FIG. 10.

The longsill weldments 14 and cross bracket weldments 16 are supported by sub-frame 18 with a series of resilient rubber pads 26 and 27 positioned therebetween for cushioning and isolation purposes. Referring to FIGS. 7–9, sub-frame weldment 18 consists of two longitudinally extending rectangular tubing members 44 which are connected together by two connecting structures 54 that are longitudinally spaced apart from each other. Each connecting structure 54 includes two lateral rectangular tubing members 46 welded between the longitudinal members 44 and two rectangular tubing longitudinal struts 50 welded between the lateral members 46. One connecting structure 54 is preferably positioned at one end of the sub-frame 18 and the other connecting structure 54 is positioned at an intermediate position. When mounting assembly 10 is assembled, the longsill weldments 14 are aligned over the longitudinal members 44 of sub-frame 18. The longitudinal members 44 are about the same width as the longsill weldments 14 and rubber pads 26 are positioned between longitudinal members 44 of sub-frame 18 and the longsill weldments 14. It is understood that the sub-frame weldment 18 depicted in FIGS. 7–9 may be modified to have other suitable configurations to accommodate varying styles of chassis rails, cross bracket weldments and longsill weldments. Although two connecting structures 54 are depicted in the figures, the number of connecting structures 54 and the positions can vary depending upon the length and style of the storage tank 12. For example, sub-frame 18 can have only one connecting structure 54 or more than two. In addition, although the structural members of sub-frame 18 are preferably rectangular tubing, alternatively, some or all of the structural members can have other suitable configurations, such as round, square or hexagonal tubing, angle or channel stock, or a solid cross-section.

The cross bracket weldments 16 are clamped to sub-frame 18 by the U-shaped brackets 20. The U-shaped brackets 20 extend beneath and around the longitudinal struts 50 to clamp and secure the longitudinal struts 50 to the base plates 38 of the cross bracket weldments 16 from underneath. The U-shaped brackets 20 are preferably formed to have right angled bends in order to closely clamp around the longitudinal struts 50. Rubber pads 27 are positioned between the U-shaped brackets 20 and the longitudinal struts 50 as well as between longitudinal struts 50 and the cross bracket weldments 16 which enables the U-shaped brackets 20 to be more tightly secured against the longitudinal struts 50. By capturing the longitudinal struts 50 with the U-shaped brackets 20, movement of the cross bracket weldments 16 relative to the sub-frame 18 is prevented in both the lateral, longitudinal and vertical directions.

The outer edge portions of the longitudinal members 44 of the sub-frame 18 are aligned over and supported by the upper arms 22a of the chassis rails 22 of the truck. The upper arms 22a may have a width that is only about half the width of the longitudinal members 44 as seen in FIG. 3. Isolator strips 24 are positioned between the sub-frame 18 and chassis rails 22 to isolate the sub-frame 18 from the chassis rails 22. Isolator strips 24 are preferably formed of plastic, but alternatively, may be formed from other suitable materials such as wood. The outer edges of longitudinal members 44 include a series of channel shaped mounting flanges 30 welded laterally thereto. The mounting brackets 52 (FIGS. 1–3) are secured to the bottom surface of mounting flanges 30 with bolts 31 and nuts 31a. The mounting brackets 52 extend downwardly from the sub-frame 18 and mounting flanges 30. The mounting brackets 52 are in turn bolted to the outer surface of the vertical legs 22b of the chassis rails 22 with bolts 56 and nuts 58 which prevents lateral, longitudinal and vertical movement of sub-frame 18 relative to the chassis rails 22. Two stop brackets 32 are welded to the longitudinal members 44 at one end for further preventing longitudinal movement of the tank 12 relative to the sub-frame 18. Although three mounting brackets 52 per side are depicted in FIG. 1, the number may vary depending upon the length of tank 12. In addition, although sub-frame 18 is preferably secured to chassis rails 22 by bolting mounting brackets 52 to the vertical legs 22b of chassis rails 22, alternatively, sub-frame 18 may be bolted directly to the upper arms 22a of chassis rails or welded thereto.

While this invention has been particularly shown and described with references to preferred embodiments thereof, it will be understood by those skilled in the art that various changes in form and details may be made therein without departing from the scope of the invention encompassed by the appended claims.

For example, although the present invention has been described for mounting an elliptical plastic storage tank to chassis rails, alternatively, the storage tank can be formed of any suitable material, such as metal, and can have other suitable shapes such as a round cross section or a cross section with composite curves. In addition, the tank can have flat or angled lower walls. Furthermore, the present invention can be employed for mounting structures other than storage tanks such as buckets or beds. The present invention can also include the combination of the storage tank with the mounting assembly. The cross bracket weldments 16, longsill reinforcement members 28, U-shaped brackets 20 and sub-frame 18 are preferably formed from steel but can alternatively be formed from stainless steel or aluminum. The number of components within mounting assembly 10 can vary depending upon the size of the tank or the particular application. Also, although the use of U-shaped brackets 20 are depicted for securing the sub-frame 18 to the cross bracket weldments 16, alternatively, brackets of other shapes can be employed (for example, flat clamping brackets) or the sub-frame 18 can be bolted or welded directly to the cross bracket weldments 16 where the bolts or welds act as the securing assembly, Finally, although particular configurations for cross bracket weldments 16, sub-frame 18 and longsill weldments 14 have been depicted in the figures, these can be varied to suit the particular application at hand.

What is claimed is:

1. A mounting assembly for an elliptical storage tank, comprising: A pair of substantially U-shaped longitudinal support structures spaced apart and each U-shaped longitudinal structure having an inner side wall, an outer side wall, and a lower wall between said side walls at a first end, wherein said inner and outer side walls of said U-shaped longitudinal support structures are secured to a curved bottom wall of said tank at a second end, and wherein said outer side wall of said U-shaped longitudinal support structures is longer than said inner side wall to abut said tank;

a pair of angled reinforcement members with a first angled portion attached to said inner walls of each said U-shaped longitudinal support structures and a second angled portion contacting said respective lower wall;

two or more generally rectangular cross bracket structures secured between said U-shaped longitudinal support structures;

a sub-frame for supporting said U-shaped longitudinal support structure, wherein said sub-frame is secured to said cross bracket structures; and a pair of longitudinal chassis rails having mounting brackets for securing said chassis rails to said sub-frame.

2. The mounting assembly according to claim 1, wherein said longitudinal support structures are formed of plastic, and said cross bracket, sub-frame and bracket assembly are formed of metal.

3. The mounting assembly according to claim 1, further comprising isolator pads between said sub-frame from said chassis rails.

4. The mounting assembly according to claim 1, further comprising resilient pads between said longitudinal support structures and said sub-frame.

5. The mounting assembly according to claim 1, wherein said sub-frame is comprised of two longitudinal members connected together by two or more lateral connecting structures.

6. The mounting assembly according to claim 5, wherein said connecting structures are comprised of two lateral members spaced apart and secured to two or more longitudinal struts.

7. The mounting assembly according to claim 5, further comprising one or more sub-frame stop brackets attached at ends of said longitudinal members.

8. The mounting assembly according to claim 7, wherein said stop brackets have a ¼ inch gap.

9. The mounting assembly according to claim 1, wherein said cross bracket structures are comprised of a generally rectangular base plate with side walls and end plates and having cross members disposed between said end plates and vertical ribs disposed between said side walls.

10. The mounting assembly according to claim 1, wherein said sub-frame is secured to said cross bracket structures by a plurality of U-shaped brackets.

11. The mounting assembly according to claim 10, further comprising stops on said U-shaped brackets, wherein said U-shaped bracket stops engage said connecting structures to limit longitudinal movement.

12. The mounting assembly according to claim 11, wherein said U-shaped bracket stops are positioned in opposing positions to prevent said longitudinal movement in either a forward or reverse direction.

13. The mounting assembly according to claim 11, wherein said stop brackets have a ¼ inch gap.

* * * * *